United States Patent [19]

Bonis

[11] Patent Number: 4,551,365
[45] Date of Patent: Nov. 5, 1985

[54] RIGID COEXTRUDED SHEET AND CONTAINER

[75] Inventor: Laszlo J. Bonis, Swampscott, Mass.

[73] Assignee: Composite Container Corporation, Medford, Mass.

[21] Appl. No.: 314,115

[22] Filed: Oct. 23, 1981

[51] Int. Cl.[4] .................. B65D 89/00; B65D 1/02; B32B 27/28

[52] U.S. Cl. .................. 428/35; 428/516; 428/517; 428/520; 264/515; 426/127; 206/557

[58] Field of Search .......... 428/35, 516, 517, 520; 264/515; 426/127

[56] References Cited

U.S. PATENT DOCUMENTS

| | | | |
|---|---|---|---|
| 3,589,976 | 6/1971 | Erb | 161/165 |
| 3,639,521 | 2/1972 | Hsieh | 260/880 |
| 4,123,576 | 10/1978 | Kobayashi et al. | 428/35 |
| 4,183,435 | 1/1980 | Thompson et al. | 206/557 |
| 4,188,443 | 2/1980 | Mueller et al. | 428/216 |
| 4,234,663 | 11/1980 | Catté et al. | 428/517 |

FOREIGN PATENT DOCUMENTS 0055382  5/1976  Japan ..................... 428/517

OTHER PUBLICATIONS

Standard Handbook for Civil Engineers, McGraw-Hill Company (1976) Sections 5-44 and 5-46.

Primary Examiner—Patricia C. Ives

[57] ABSTRACT

A coextruded thermoplastic sheet suitable for thermoforming into a rigid container, the sheet including a bulk layer made of a first material and a pair of bending moment resisting layers adhered to opposite surfaces of the bulk layer, the moment resisting layers being made of a second material that is more rigid than the first material, whereby the bulk layer acts to locate the second material of more rigidity at a location spaced from the neutral axis of the sheet where it efficiently resists bending moments and provides rigidity to the sheet.

8 Claims, 5 Drawing Figures

U.S. Patent  Nov. 5, 1985  4,551,365
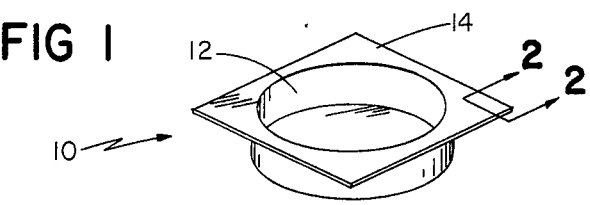
FIG 1
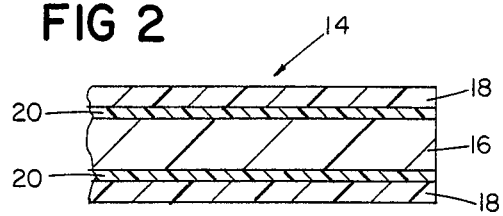
FIG 2
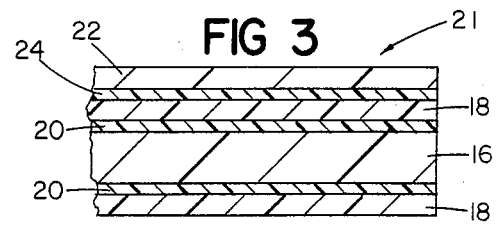
FIG 3
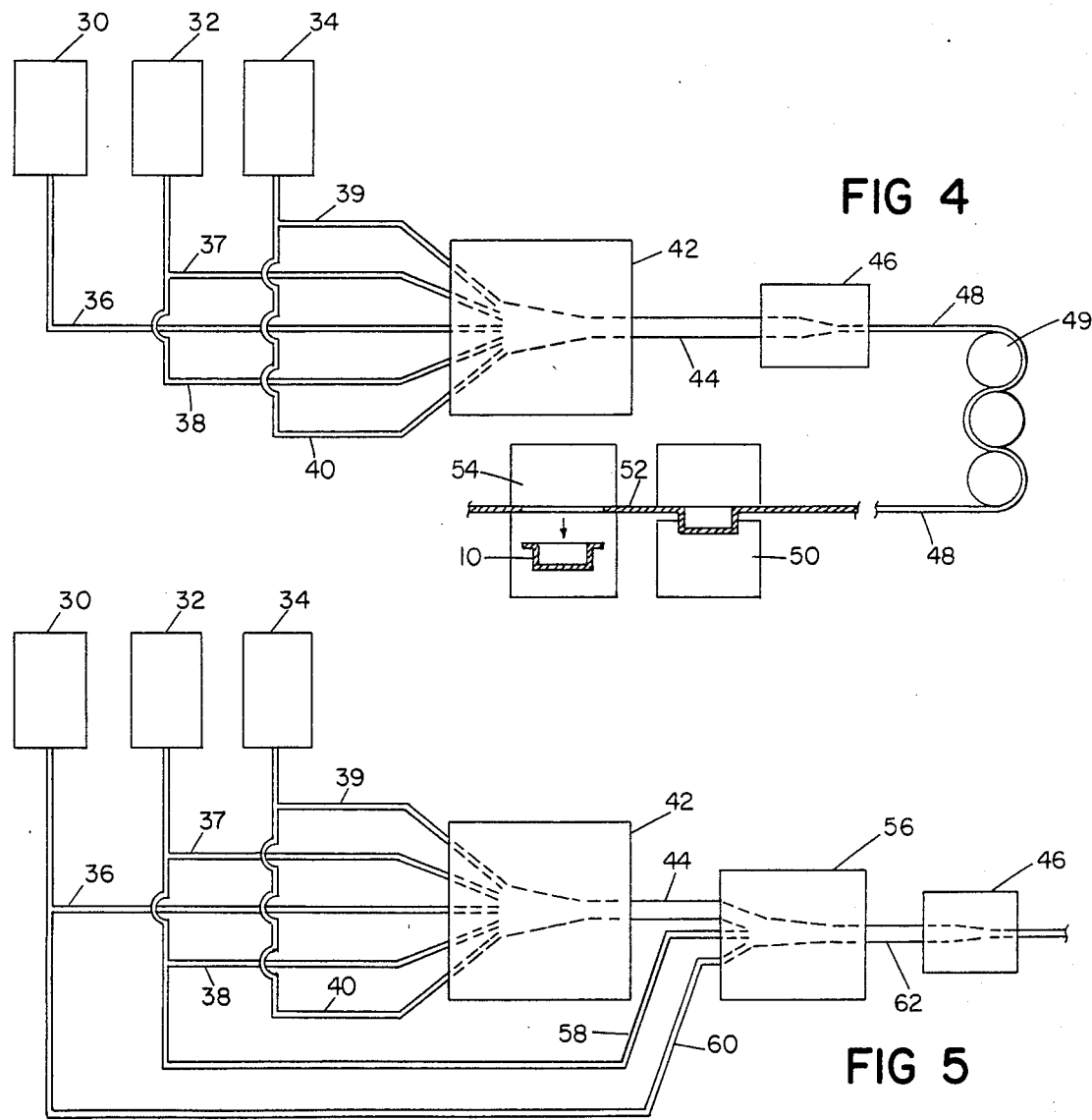
FIG 4
FIG 5

RIGID COEXTRUDED SHEET AND CONTAINER

FIELD OF THE INVENTION

The invention relates to coextruded sheets and rigid containers formed therefrom.

BACKGROUND OF THE INVENTION

Multilayered sheets with layers of different plastic materials have been coextruded in the past. The materials for the layers are selected to provide different properties (e.g., oxygen barrier, moisture barrier, thermoformability, heat sealability, heat resistance) depending upon the particular application for the sheet.

In selecting materials for the layers of the sheets, one is often seriously constrained because the different layers must be made of materials that adhere to other layers in the sheets, and some materials should be in interior layers protected from moisture. Also, when the sheet is to be formed into food containers, the food contacting layers must be made of material approved by the Food and Drug Administration. The resulting sheets may thus have rigid materials placed in the center of the sheets owing to such design constraints, and if a more rigid sheet is desired, the layers must be made thicker. For example, acrylonitrile-methyl acrylate copolymer provides excellent oxygen barrier properties and is very rigid; however, it is often coextruded as an interior layer because it has not been approved for food contact by the Food and Drug Administration.

SUMMARY OF THE INVENTION

It has been discovered that when coextruding a sheet from layers of a rigid material and a less rigid material, by coextruding the less rigid material on the inside of the sheet, as a bulk layer, and the more rigid material in layers outside the bulk layer, the rigid material is located at a position spaced from the neutral axis of the sheet where it is more effective in resisting bending moments, and a rigid sheet results.

In preferred embodiments, the layers of rigid moment resisting material are made of acrylonitrile-methyl acrylate copolymer, and the rigid layers are connected to the bulk layer by adhesive tie layers that are coextruded with the bulk layer and the rigid material layers; a cover layer is bonded to one of the acrylonitrile-methyl acrylate copolymer layers by an adhesive tie layer to result in a seven-layer sheet useful in packaging food; the cover layer is made of the same material as the bulk layer; and the bulk layer is made of medium density polyethylene, low density polyethylene, linear low density polyethylene, or polypropylene.

In addition to efficiently using the rigid material by positioning it where it is effective in resisting bending moments, smaller amounts of the rigid material are required, and this results in savings of money when the rigid material is an expensive material such as acrylonitrile-methyl acrylate copolymer.

The preferred use of the sheet is a rigid container thermoformed from the sheet. The preferred use for the seven-layer sheet with the cover layer is a food container in which the cover layer is on the interior of the container; such a container is rigid and has excellent resistance to oxygen transmission owing to the acrylonitrile-methyl acrylate layers, and the cover layer prevents contact of the food by the acrylonitrile-methyl acrylate layer.

Another aspect the invention features manufacturing the sheets described above by coextrusion. In the preferred method of manufacturing the seven-layer sheet, the less rigid bulk material, the rigid material, and the tie layer material are injected into a first coextrusion block to form a five-layer stream having the bulk material in the middle, separated from outer layers of the rigid material by intermediate layers of the tie layer material; the five-layer stream is injected into a second coextrusion block with additional streams of the bulk material and the tie layer material to form a seven-layer stream comprising the five-layer stream, an intermediate tie layer, and a cover layer of the same material as the bulk layer; and the seven-layer stream is then passed through a coextrusion die to result in a seven-layer sheet with the cover layer on one surface where it can be used as a food contacting layer in a container. By this method of manufacture, a complex multilayered sheet is simply and expeditiously prepared from three sources of material by a single coextrusion process, and there is no need for laminating a large number of different layers or multilayered sheets together.

DESCRIPTION OF THE PREFERRED EMBODIMENT

The structure and manufacture of the presently preferred embodiment of the invention will now be described after first briefly describing the drawings.

DRAWINGS

FIG. 1 is a perspective view of a container according to the invention.

FIG. 2 is a cross-sectional view, taken at 2—2 of FIG. 1, showing the multilayer structure of the container.

FIG. 3 is a cross-sectional view of a portion of a multilayered container of another embodiment of the invention.

FIG. 4 is a diagrammatical view of the manufacturing process for forming the FIG. 1 container.

FIG. 5 is a diagrammatical view of the manufacturing process for forming a sheet for the FIG. 3 container.

STRUCTURE

Referring to FIG. 1 there is shown plastic container 10 with cylindrical depression 12 having an opening in square face 14. Container 10 is made from a multilayer sheet formed by coextrusion.

Referring to FIG. 2 there is shown a portion of the face 14 of container 10. It includes a central bulk layer 16 made of medium density polyethylene (available from Chemplex Company under the trade designation Chemplex 3024 and having a tensile modulus of greater than $0.27 \times 10^4$ kg/cm$^2$ and a melt flow index of 3.0 decigrams/min), outer layers 18 of rigid acrylonitrile-methyl acrylate copolymer (sold under the trade designation Barex 210 by Vistron Corp. and having an O$_2$ permeability at 73° F. of 0.8 cc/mil/100 in$^2$-24 hr-atm, a melt flow index of 3 decigrams/min, and a tensile modulus of $3.59 \times 10^4$ kg/cm$^2$), and two intermediate tie layers 20 made of adhesive material (sold by Phillips Chemical Company under the trade designation Solprene 416P, a block polymer having a butadiene/styrene ratio of 70/30, a molecular weight of 140M, a specific gravity of 0.94 and a melt flow index of 2 decigrams/min). In thermoformed container 10, structural bulk layer 16 is 10 mils thick, outer rigid layers 18 are each 3 mils thick, and the intermediate adhesive tie layers 20 are each ½ mil thick, resulting in a 17 mil thick wall. The rigid material in outer layers 18 is spaced from the neutral axis, which passes through the center of bulk layer 16, at locations where it is effectively used to resist bending moments and provide rigidity to sheet 14. Thus, smaller amounts of rigid material can be used, and this results in savings of money when the rigid material is more expensive than the bulk material. (E.g., here acrylonitrile-methyl acrylate is substantially more expensive than polyethylene.)

Referring to FIG. 3, the seven-layer structure of face 21 of a container suitable for packaging food is shown. The five bottom layers are the same as the layers of the FIG. 2 structure; there is also included 3.0 mil thick cover layer 22 of medium density polyethylene (made of the same material as bulk layer 16) adhered to the upper rigid layer 18 by 0.5 mil thick adhesive tie layer 24 (made of the same material as adhesive tie layers 20). Cover layer 22 is on the interior so that the food contacts it and not the acrylonitrile-methyl acrylate copolymer rigid layer below it, which copolymer is not approved for use as a food contacting material.

MANUFACTURE

Referring to FIG. 4, the coextrusion process for forming the five-layer sheet for container 10 is shown. Three heated containers 30, 32, and 34, serve as sources of medium density polyethylene, adhesive tie layer, and acrylonitrile-methyl acrylate, respectively. Five conduits 36, 37, 38, 39, 40, supply the heated materials to coextrusion block 42. There the materials merge together to form under pressure a unitary, five-layer thick stream 44 of generally circular cross-section. The middle layer is made of the polyethylene, the outer layers are made of acrylonitrile-methyl acrylate, and the intermediate layers are made of the adhesive tie layer material. Stream 44 passes into extrusion die 46 (e.g., Welex standard 54" flex-lip) and is extruded into continuous sheet 48, about 34 mils thick. Sheet 48 then passes through a series of chill rolls 49. The sheet may then be processed into containers, or wound into spools (not shown) for storage.

To process sheet 48 into containers, the sheet is passed through conventional thermoforming apparatus 50 (the vacuum forming type well-known in the art), which impresses the container shape and in so doing reduces the wall thickness by about 50% on the average, making the finished container wall about 17 mils thick. The thicknesses of individual layers are also reduced by about 50% during thermoforming. After thermoforming, shaped sheet 52 passes through trim press 54, in which individual containers 10 are separated. In use, a square cover sheet (not shown) is sealed to square face 14 after the contents have been placed in depression 12.

Referring to FIG. 5, the modification of the FIG. 4 apparatus for the construction of the seven-layer sheet is shown. Second coextrusion block 56 is inserted between first coextrusion block 42 and coextrusion die 46. Five-layer stream 44 is fed into coextrusion block 56 along with a stream of adhesive tie layer material from conduit 58, connected to conduit 38, and polyethylene material from conduit 60, connected to conduit 36. In coextrusion block 56, the materials merge together to form under pressure a unitary, seven-layer thick stream 62 of generally circular cross-section, and stream 62 is passed through coextrusion die 46.

By this method of manufacture, a complex multilayered sheet is simply and expeditiously prepared from three sources of material by a single coextrusion process, and there is no need for laminating a large number of different layers or multilayered sheets together.

OTHER EMBODIMENTS

Other embodiments of the invention are within the scope of the appended claims. For example, other rigid layers can be used in place of the acrylonitrile-methyl acrylate copolymer to result in a rigid sheet. Other inexpensive materials can be used for the bulk middle layer 16 (e.g., low density polyethylene, linear low density polyethylene, or polypropylene), and other adhesive tie layers will work. Also, two coextrusion blocks are not necessary; a single block adapted to receive seven streams will work.

What is claimed is:

1. A coextruded thermoplastic sheet suitable for thermoforming into a rigid container, said sheet comprising
   a bulk layer made of a first nonfoamed material,
   a pair of bending moment resisting layers adhered to opposite surfaces of said bulk layer and made of a second material that is more rigid than said first material,
   said second material being acrylonitrile-methyl acrylate copolymer, said moment resisting layers being adhered to said bulk layer by adhesive tie layers coextruded with said bulk layer and said moment resisting layers,
   whereby said bulk layer acts to locate said second material of more rigidity at a location spaced from the neutral axis of said sheet where it efficiently resists bending moments and provides rigidity to said sheet.

2. The sheet of claim 1 further comprising a cover layer bonded to a said moment resisting layer by a tie layer, to permit use of said sheet in packaging food.

3. The sheet of claim 2 wherein said cover layer is made of said first material.

4. The sheet of claim 1 or 3 wherein said first material is medium density polyethylene, low density polyethylene, linear low density polyethylene, or polypropylene.

5. A container thermoformed from a coextruded sheet, said container comprising
   a bulk layer made of a first nonfoamed material,
   a pair of bending moment resisting layers adhered to opposite surfaces of said bulk layer and made of a second material that is more rigid than said first material,
   said second material being acrylonitrile-methyl acrylate copolymer, said moment resisting layers being adhered to said bulk layer by adhesive tie layers coextruded with said bulk layer and said moment resisting layers,
   whereby said bulk layer acts to locate said second material of more rigidity at a location spaced from the neutral axis of said sheet where it efficiently resists bending moments and provides rigidity to said sheet.

6. The container of claim 5 further comprising a cover layer bonded by a tie layer to the said moment resisting layer that is on the interior of said container, to permit use of said container to package food.

7. The container of claim 6 wherein said cover layers is made of said first material.

8. The container of claim 5 wherein said first material is medium density polyethylene, low density polyethylene, linear low density polyethylene, or polypropylene.

* * * * *